(12) United States Patent
May et al.

(10) Patent No.: US 11,807,409 B1
(45) Date of Patent: Nov. 7, 2023

(54) NETTING MACHINE WITH MULTIPLE NETTING CHUTE EXCHANGE SYSTEM

(71) Applicant: Tipper Tie, Inc., Apex, NC (US)

(72) Inventors: Dennis May, Pittsboro, NC (US);
Adam Keever, Tazewell, TN (US);
Samuel Griggs, Apex, NC (US)

(73) Assignee: Tipper Tie, Inc., Apex, NC (US)

( * ) Notice: Subject to any disclaimer, the term of this patent is extended or adjusted under 35 U.S.C. 154(b) by 0 days.

(21) Appl. No.: 17/660,280

(22) Filed: Apr. 22, 2022

(51) Int. Cl.
*B65B 9/15* (2006.01)
*B65B 9/10* (2006.01)
*B65B 25/06* (2006.01)
*B65B 39/00* (2006.01)
*A22C 17/00* (2006.01)

(52) U.S. Cl.
CPC .................. *B65B 9/15* (2013.01); *B65B 9/10* (2013.01); *B65B 25/06* (2013.01); *B65B 39/007* (2013.01); *A22C 17/0093* (2013.01)

(58) Field of Classification Search
CPC .... B65B 9/10; B65B 9/13; B65B 9/15; B65B 9/18; B65B 25/06; B65B 25/065; B65B 39/007; A22C 11/0227; A22C 17/0093; A22C 2013/026
See application file for complete search history.

(56) References Cited

U.S. PATENT DOCUMENTS

| | | | | |
|---|---|---|---|---|
| 557,032 A | * | 3/1896 | Seideman | A22C 11/02 100/145 |
| 2,917,888 A | * | 12/1959 | Hawley | B65B 25/065 100/910 |
| 3,234,709 A | * | 2/1966 | Hertwig et al. | B65B 25/065 141/249 |
| 3,964,236 A | | 6/1976 | Smith | |
| 4,495,751 A | * | 1/1985 | Galbiati | B65B 9/15 53/581 |
| 4,649,601 A | * | 3/1987 | Kollross | A22C 11/0227 452/34 |
| 6,139,416 A | | 10/2000 | Toepfer | |
| 6,572,464 B1 | | 6/2003 | Hergott et al. | |
| 7,237,369 B2 | * | 7/2007 | Griggs et al. | A22C 11/125 53/138.4 |
| 7,392,635 B2 | | 7/2008 | May et al. | |
| 7,666,071 B2 | | 2/2010 | Nakamura et al. | |
| 9,567,125 B2 | | 2/2017 | May et al. | |
| 9,622,491 B2 | | 4/2017 | Bolzacchini | |

* cited by examiner

*Primary Examiner* — Stephen F. Gerrity
(74) *Attorney, Agent, or Firm* — CHRISTENSEN O'CONNOR JOHNSON KINDNESS PLLC

(57) ABSTRACT

A packaging machine 20 includes a feeding system 22 for delivering and positioning work products, in registry with a chute system 28 as well as in registry with a pushing system 26 for pushing the work products through a stuffing tube 24 of the chute system 28. The chute system 28 also includes a plurality of individual chute assemblies 30, each constructed with an elongate chute 32 positionable in registry with the stuffing tube 24 for receiving the food products from the stuffing tube and guiding the work product into packaging material 34 which has been shined over the elongate chute. The plurality of chute assemblies 30 are mounted on a transverse mounting structure 44 to slide along the mounting structure to sequentially position chute assemblies, loaded with packaging material, in alignment with the stuffing tube 24 to receive the work products. Additional chute assemblies 30 are positionable on either side of the chute assembly in use.

14 Claims, 9 Drawing Sheets

NETTING MACHINE WITH MULTIPLE NETTING CHUTE EXCHANGE SYSTEM

BACKGROUND

Certain types of commodities and/or industrial items can be packaged by placing the desired product(s) in a covering material, then applying a closure clip or clips to end portions of the covering material to secure the product(s) therein. For non-flowable piece goods, the piece goods can be held individually in a respective clipped package, or as a group of discrete or integrated (e.g., compressed) goods in a single package. The covering material can be any suitable material, typically a shirred casing and/or netting material.

These packaging systems typically include a longitudinal product chute that holds a length of a casing and/or netting sleeve shirred over the exterior of the chute. A first downstream end portion of the netting is typically gathered and clipped closed using a first clip. As the product exits the product chute, it is covered with the casing and/or netting. The leading and trailing edges of can be gathered and clipped, typically using single or double clippers. Clipping mechanisms or "clippers" are well known to those of skill in the art. Examples of clip attachment apparatus and/or packaging apparatus are described in U.S. Pat. Nos. 3,389,533; 3,499,259; 4,683,700; and 5,161,347, the contents of which are hereby incorporated by reference as if recited in full herein.

Knitted and extruded netting is a packaging material of choice for certain industries including meat and poultry, aquaculture, horticulture, Christmas tree, PVC pipe, environmental, aviation, fruit and produce, toys, housewares, and the like. Knitted netting can be soft, flexible, and conformable to a variety of irregularly shaped products. Knitted netting enables air circulation to the packaged products, and can be decorative and protective. Netting is commonly used for hams, whole birds, poultry breasts, and molded meat products.

In traditional packaging systems a single packaging chute is detachably mounted to the machine to be manually removed when the shined casing or netting has been depleted. The empty chute is replaced with one that has been previously loaded with casing or netting or other packaging material. As can be appreciated, this procedure is time consuming and requires the attention of personnel each time the packaging chute is depleted.

The present disclosure seeks to address this drawback of existing packaging machines without significantly adding to the complexity or cost of existing packaging systems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
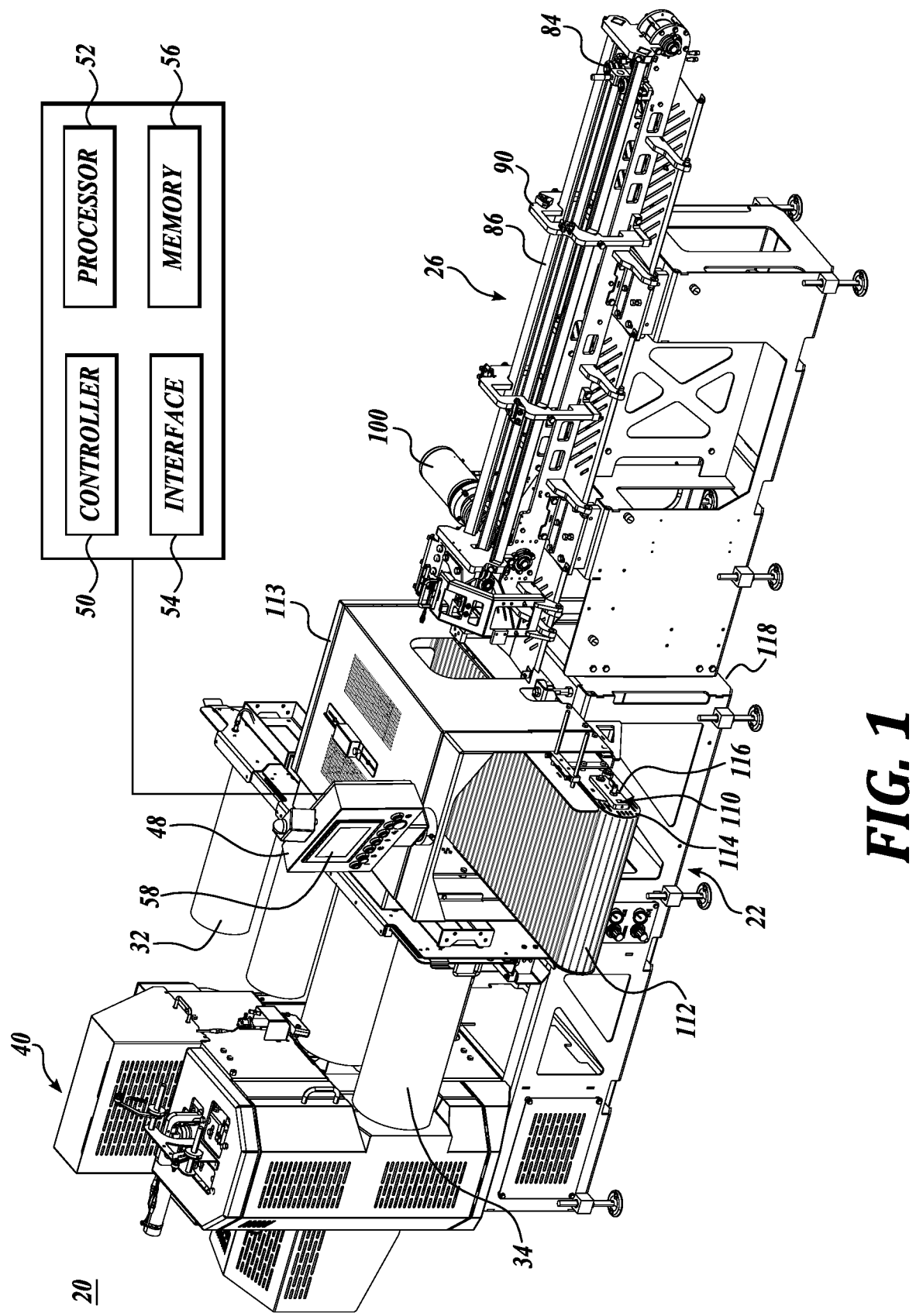
FIG. 1 is a front perspective view of the netting machine of the present disclosure.

The description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above," "below," "horizontal," "vertical," "top," "bottom," "right hand," "left hand," "in," "out," "extended," "advanced," "retracted," "proximal," and "distal." These references and other similar references in the present application are only to assist in helping describe and understand the present disclosure and are not intended to limit the present invention to these directions.

The present application may include modifiers such as the words "generally," "approximately," "about," or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out.

The present application refers to "product," "work product," "workpiece" or "substrate" synonymously. One example of a product, work product or workpiece described in the present application is a food item or food product FP, such as, for example, beef, pork, poultry, fish, vegetables, fruits, and nuts.

Embodiments of the present disclosure are suitable for devices that cooperate with clippers to apply closure clips to products held in a packaging or covering material. The packaging material may be natural or synthetic and may be a casing material that can be sealed about a product or may be netting. The casing can be any suitable casing (edible or inedible, natural or synthetic) such as, but not limited to, collagen, cellulose, plastic, elastomeric or polymeric casing. In certain embodiments, the casing comprises netting. The term "netting" refers to any open mesh material in any form including, for example, knotted, braided, extruded, stamped, knitted, woven or otherwise. Typically, the netting is configured so as to be stretchable in both axial and lateral directions.

Optionally, shirred casing and/or netting or other covering material may be used to package discrete meat products, such as loaves of meat that are raw, partially, or even totally cooked, or other meat or items. Other embodiments of the present invention may package other types of food as well as non-food items. Examples of non-food items that may be packaged using embodiments of the present invention include dirt, sand, and mulch, as well as inanimate objects. Additional examples of products include discrete, semi-solid, or solid objects such as pet food. The product may be packaged for any suitable industry including horticulture, aquaculture, agriculture, or other food industry, environmental, chemical, explosive, or other application. Shirred casing and/or netting may be useful to package whole muscle (uncooked meat), ham, or turkeys.

Generally stated, some particular embodiments of the present disclosure are directed at automating the packaging of discrete pieces of whole muscle (animal) meat food product by compressing the whole muscle pieces into a single product. The compressed product can then optionally be automatically pushed through a product chute and wrapped or enveloped in a covering material such as casing and/or netting (e.g., "open net", so that the whole muscle therein is exposed to environmental conditions), then automatically or semi-automatically clipping the covering material with a closure clip or other attachment means to close the covering and hold the compressed product inside of the covering material.

Figure 2:
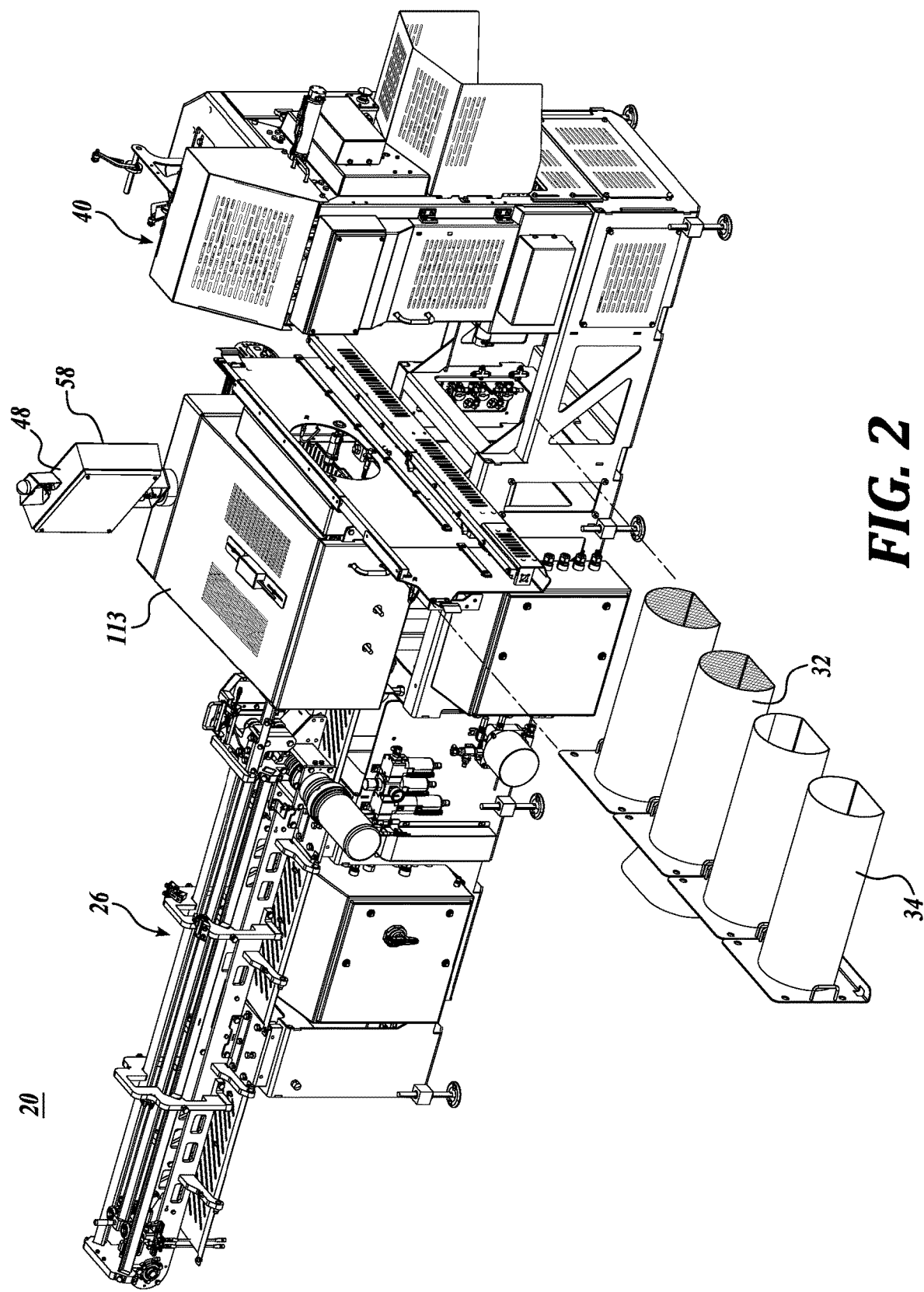
FIG. 2 is a rear perspective view of FIG. 1.

FIGS. 1 and 2 depict a packaging machine 20 that includes a feeding system 22 for delivering and positioning work products, including for example, food products, in registry with a chute system 28 as well as in registry with a pushing system 26 for pushing the food projects through a stuffing tube 24 of the chute system 28. The chute system 28 also includes individual chute assemblies 30, each constructed with an elongate chute 32 positionable in registry with the stuffing tube 24 for receiving the food products from the stuffing funnel and guiding the food product into packaging material 34 which has been shined over the elongate chute. Once the food product has been enveloped within the packaging material 34, a clipping system 40 gathers the packaging material tightly behind the food product and then applies a first clip to the packaging material. The clipping system 40 next applies a second clip a short distance upstream from the first clip to form the closed first or leading end of the packaging section for the next food product. Thereafter, the gathered packaging material is severed between the two clips so that the packaged food product can continue to the next processing stage.

The chute system 28 in general includes a plurality of chute assemblies 30 mounted on a transverse mounting structure 44 to slide along the mounting structure to sequentially position chute assemblies loaded with packaging material, in alignment with the stuffing tube 24 to receive the food products. Additional chute assemblies 30 are positionable on either side of the chute assembly in use (aligned with the stuffing tube). These additional chute assemblies 30 can be shirred with packaging material 34 ready for use once the packaging material mounted on the chute assembly in use has been depleted.

These additional chute assemblies 30 can also be assemblies wherein the packaging material has already been depleted. Such empty chute assemblies can be removed so that the packaging material can be re-shirred (i.e., reloaded) thereon. The chute assemblies 30 can be automatically moved along the mounting structure 44 by an actuating system 46 when the packaging material has been depleted from the chute assembly to position a new fully loaded chute assembly in registry with the stuffing tube 24.

As depicted in FIG. 1, the packaging machine 20 is operated with a control system 48 mounted on a housing of the feeding system 22. The interior components of the control system 48 are schematically illustrated as including a controller 50 for use in controlling the operation of machine 20. The control system also includes a processor 52 linked to the controller. An appropriate interface 54 is provided for connecting the various motors, actuators, gauges, measuring devices, and components of the apparatus 20 to the controller 50. A memory unit 56 is provided for storing information regarding the apparatus 20, and an input device in the form of a touch screen 58 is provided to enable the operator to communicate with the processor and controller. The touch screen also serves as a display to convey information from the processor or control system to the operator, including the functioning of the apparatus 20. An example of a processor-operated control system for controlling a packaging machine is disclosed by U.S. Pat. No. 9,567,125, which is incorporated herein by reference.

Figure 3:
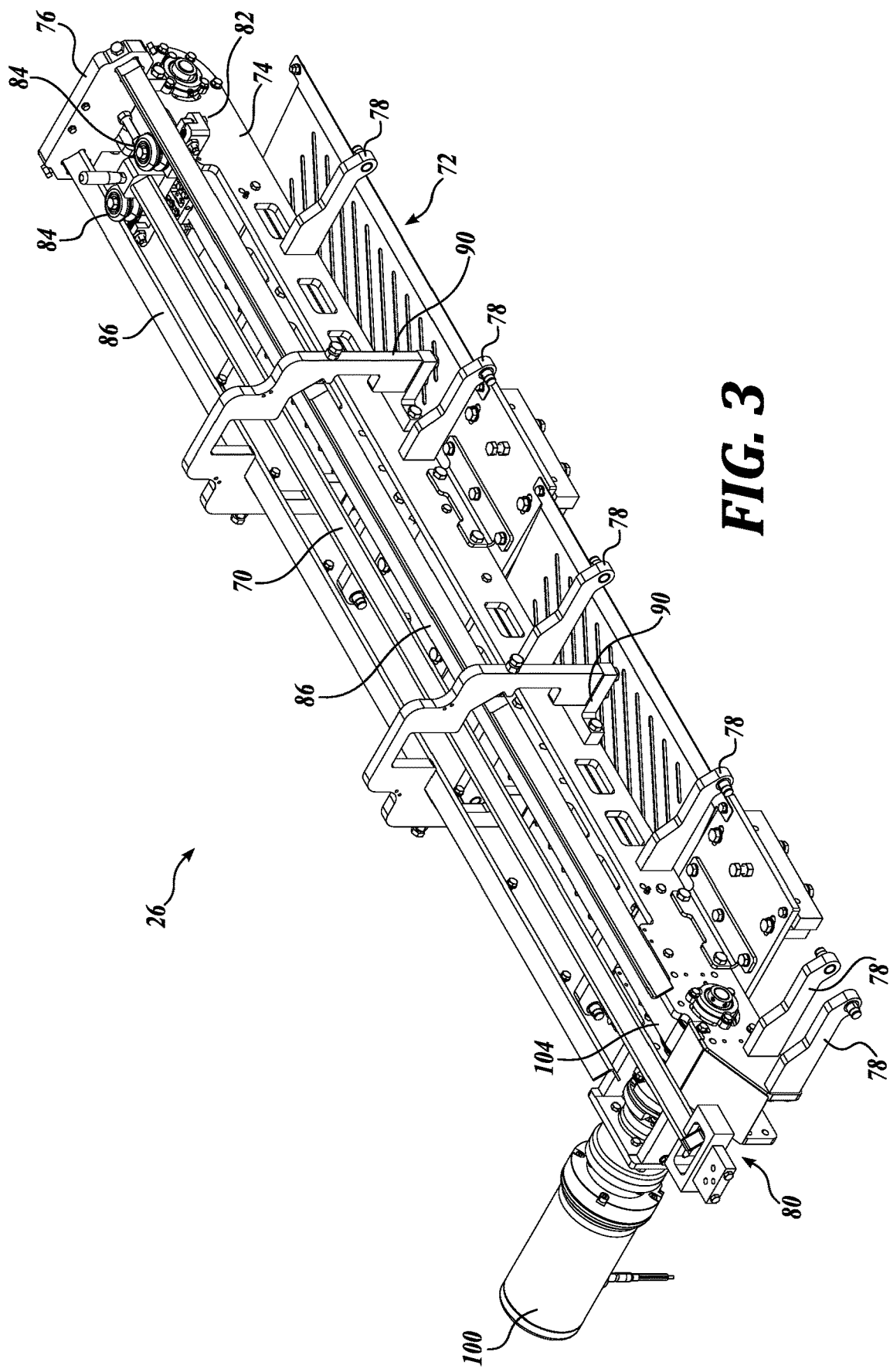
FIG. 3 is a fragmentary perspective view of FIG. 1.
Figure 4:
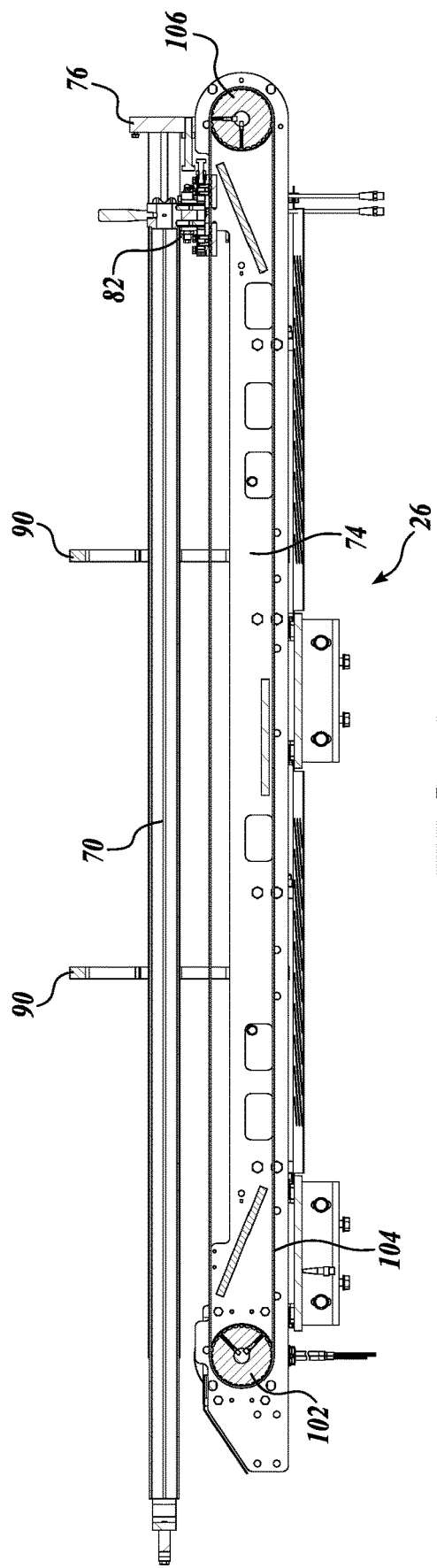
FIG. 4 is a partial fragmentary elevation of FIG. 3.

Referring to FIGS. 1, 3, and 4, pushing system 26 includes an elongate pushing shaft 70 which is reciprocal along its length while supported by a frame structure 72. The frame structure 72 includes longitudinal sidewalls 74 that are connected at the distal end of the frame structure by an end wall 76, and are connected at locations intermediate ends of the frame structure by transverse brackets 78. A pusher head assembly 80 is mounted to the proximal end of the pushing shaft 70.

At its distal and the pushing shaft 70 is mounted to a carriage 82. The carriage 82 includes horizontal guide rollers 84 that roll along parallel, spaced apart guide rods 86 which extend the length of the frame structure 72. At their distal ends the guide rods 86 are attached to the end wall 76, and intermediate their ends the guide rod 86 are secured to transvers, upright mounting brackets 90.

The pushing shaft 70 is reciprocated along the length of the frame structure 72 by a servo motor 100 which powers a cog wheel 102 axled to the proximal end of the frame structure 72. A cog belt 104 is driven by the cog wheel 102, with the cog belt extending the length of the frame structure 72 to wrap an idler cog wheel 106 mounted at the distal end of the frame structure 72. The ends of the cog belt 104 are attached to the carriage 82 so that movement of the cog belt results in corresponding movement of the carriage 82, and thus also the pushing shaft 70.

It will be appreciated that by use of the servo motor 100, it is possible to alter the stroke of the pushing shaft 70 as desired, for example, to accommodate different sized food products being packaged as well as chutes 32 of different lengths. The pushing shaft pushes the food product from the feeding system 22, through the stuffing funnel 24, through the elongate chute 32 and far enough into the packaging material 34 that the packaging material, with the food product enveloped therein, can be gathered and double clipped and then cut between the two clips. Information of the desired stroke of the pushing shaft for specific products may be retained in the memory 56 of the control system 48.

Moreover, the servo motor 100 is programmable to apply desired acceleration and/or deceleration forces on the pusher head assembly 80 based on selected factors or parameters, such as, for example, the weight of the food products being packaged, the size of the food products, which typically is larger than the size of the elongate chute 32, the desired cycle speed of the apparatus 20, etc. The control parameters for the servo motor 100, size of stuffing funnel 24, configuration of the chute system 28, etc., may be stored in the memory unit 56.

Referring to FIG. 1, the feeding system 22 includes a conveyor 110 composed of an endless conveyor belt 112 positioned transversely to the length of the pushing system 26, and in particular the pushing shaft 70, as well as transversely to the length of the elongate chutes 32. As shown in FIG. 1, the endless conveyor belt 112 extends laterally from the housing 113 of the feeding system so as to present a loading or feeding surface on which the work products to be packaged may be placed either manually or automatically by a delivery conveyor or a robot, or other mechanical means.

The conveyor belt 112 is trained around an idler roller 114 axled on the ends of sidewalls 116 extending along the exterior sides of the conveyor 110. Although not visible, a drive roller is mounted on the opposite ends of the sidewalls 116. The drive roller is powered by a motor, also not visible. This motor can be of various types for example a stepper motor or a servo motor.

The side walls 116 are in turn supported by a frame structure 118. In this regard, the sidewalls 116 can be mounted to the frame structure 118 so as to enable the conveyor 110 to raise and lower relative to the stuffing funnel 24 thereby to adjust for different size work products. This assists in centering the work product relative to the stuffing funnel 24.

As in the other powered systems of apparatus 20, the operation of the feeding system 22 is controlled by the control system 48. In this regard, the control system operates to advance work products loaded on to the conveyor belt 112 to align with the stuffing funnel 24. To this end, proximity sensors, or other types of sensors can be utilized to help control the movement of the conveyor belt 112, thereby to center the work product relative to the stuffing funnel 24.

Referring specifically to FIGS. 5-9, and as noted above, chute system 28 includes in basic form a mounting structure 44 for receiving a plurality of chute assemblies 30 that are movable along the mounting structure by the actuator system 46. The mounting structure 44 includes a mounting frame assembly 130 for mounting the structure 44 to the apparatus 20 and a mounting plate assembly 132 for receiving the chute assemblies 30. The mounting frame assembly 130 includes the generally U-shaped major bracket 134 used to physically attach the mounting structure 44 adjacent the housing 113 of the feeding system 22, noted above, using hardware members 136 extending though flanges 138 formed in the base of the major bracket 134. Secondary brackets 140 extend laterally from the sides of the major bracket 134 for attachment to the mounting plate assembly 132, described below. For rigidity, both the major bracket 134 and the secondary brackets 140 project perpendicularly to the mounting plate assembly.

The stuffing tube 24 is mounted to the major mounting bracket 134 to present an entry for the food product from the feeding system 22 to the chute assemblies 30. The stuffing tube 24 includes the mounting plate 142 and a funnel section 144 that projects from the mounting plate. The mounting plate 142 is attached to the U-shaped major bracket 134 opposite the mounting plate assembly 132 so that the funnel section 144 extends through the bracket 134 and mounting frame assembly 130 to terminate at the chute 32 of a chute assembly 30.

Figure 8:
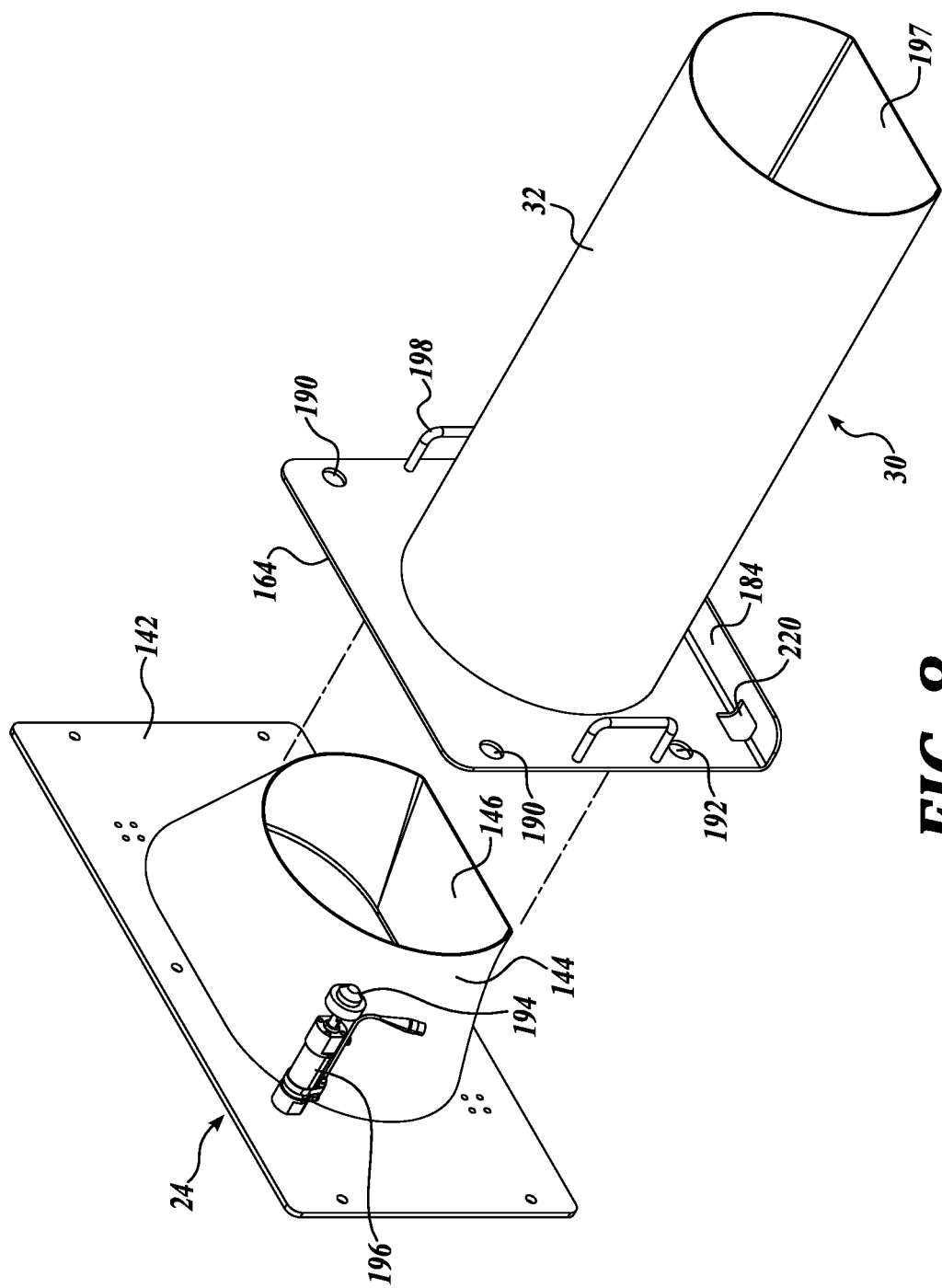
FIG. 8 is an isometric view of a stuffing funnel and chute assembly of the present disclosure.

As shown in FIG. 8, the funnel section 144 transitions from an oblong, generally flat oval shape at the mounting plate 142 to a reduced-size, generally circular shape distal from the mounting plate 142. Rather than being entirely circular in shape, the lower portion of the funnel section 144 is substantially flat, thereby to define a generally planar, sloped floor section 146. As described below, the size and shape of the distal end of the funnel section 144 closely matches size and shape of the elongate chutes 32 of the chute assemblies 30.

The mounting plate assembly 132 includes a transverse plate 150 that is mounted to the mounting frame assembly 130 with hardware members interconnecting the plate 150 with the major bracket 134 and the secondary brackets 140. A hole 152 is formed in the plate 150 to coincide with the cross-sectional shape and size of the distal end of the funnel section 144 and the cross-sectional shape and size of the chutes 32 of the chute assemblies 30.

Referring to FIGS. 5, 6, 7, and 9, upper and lower guide strips 154 and 156 extend along the upper margin of the plate 150 above the hole 152 and a lower portion of the plate 150 below the hole 152. The guide strips provide low friction surfaces along which the chute assemblies can move along the mounting plate assembly 130. To this end, a guideway is provided to support and retain the chute assembly for movement along the length of the plate 150.

In one form of the present disclosure, the guideway may include an upper guide rail 158 is mounted to the underside of a flange 160 projecting from the upper margin of plate 150. The upper guide rail 158 is formed with a shoulder 162 to capture the upper margin of the slide plate 164 of the chute assemblies 30.

The guideway also includes a lower guide rail 170 is mounted to the upper horizontal flange 172 of a formed bracket 174 extending along the lower margin of the plate 150. Mounting blocks 176 are provided to mount the formed bracket 174 to the plate 150 using hardware members 178. A shoulder 182 is formed along the upper surface of the lower guide rail 170 to serve as a sliding surface for a lower flange 184 formed in the slide plates 164, see FIG. 8. In this manner the slide plate 164 is held captive against the lower guide strip 156 while enabling the slide plate to antifrictionally move along the mounting plate assembly 132.

Figure 6:
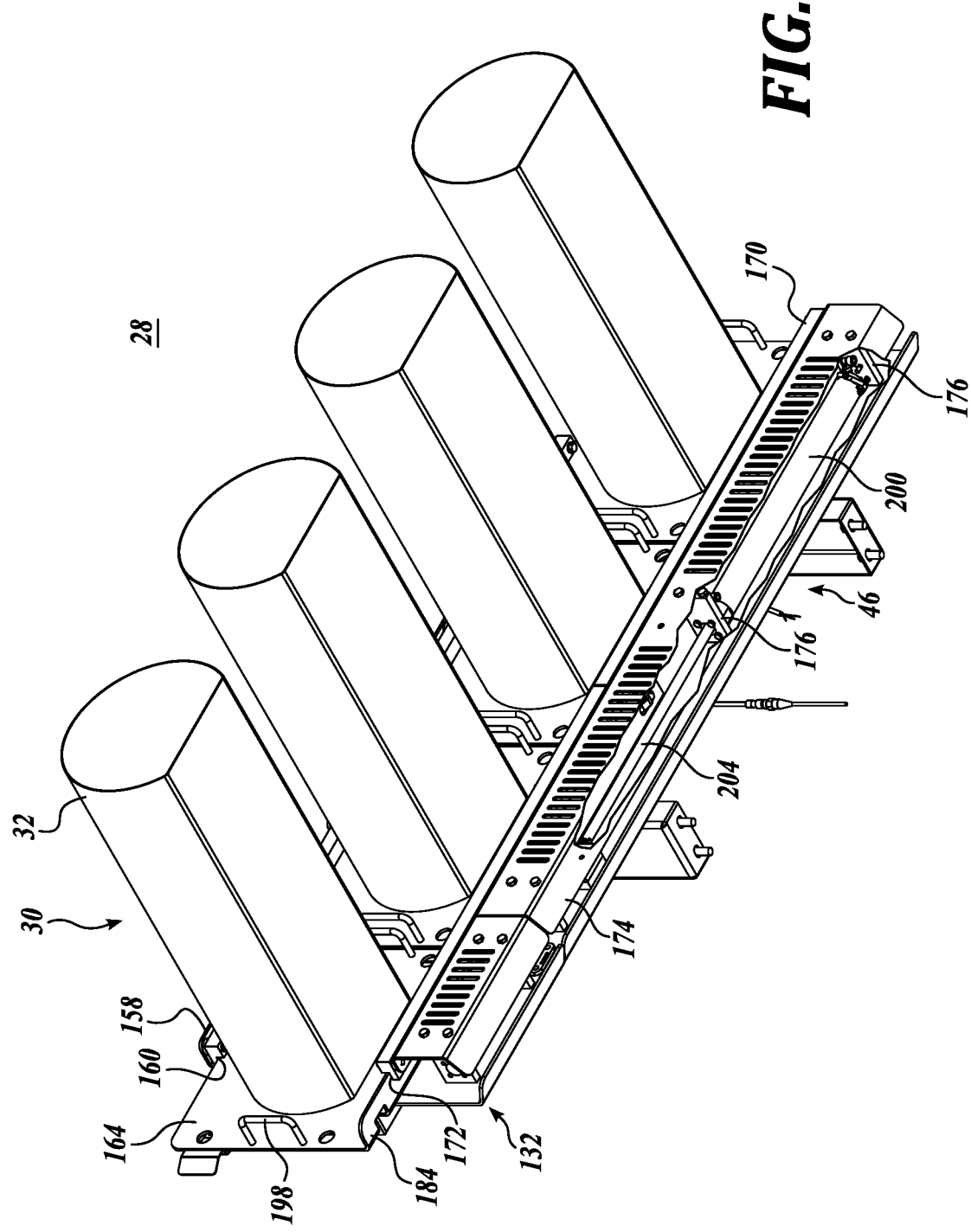
FIG. 6 is a view from the opposite side of FIG. 5.

As most clearly shown in FIGS. 6 and 8, the chute assemblies 30 each include a rectilinear slide plate 164, mentioned above, as well as and an elongate tubular chute 32 projecting from the slide plate. The slide plate 164 is generally as planar and configured to slide along the upper and lower guide rails 158 and 170, as described above. As also noted above, a lower flange 184 is formed along the bottom margin of the slide plate 164 to be held captive by and to slide along the lower guide strip 156.

With more particularity, the slide plate 164 includes a pair of upper through holes 190 located adjacently upper corners with a slide plate, as well as a pair of lower through holes 192 located below the upper through holes 190. These through holes 190 and 192 are positioned and sized to receive the leading end of a tapered plunger 194 of an actuator 196 mounted to the mounting frame assembly 130

(see FIG. 7), thereby to retain the chute assembly 30 stationary with respect to the mounting plate assembly 132 and in registration with the stuffing funnel 24 during use of the apparatus 20.

The elongate chute 32 projects forwardly from the slide plate 164. In cross-section, the chute corresponds to the shape at the projecting end of the funnel section 144. In this regard, the chute is generally circular, but with a flattened bottom or floor section 197. The flattened bottom 197 reduces the circumference of the chute and thus the circumference of the work product, e.g. poultry, being fed through the chute so that the netting or casing can be placed over the work product while in reduced circumference condition, and after leaving the chute the work product expands to its nominal circumference and presses tightly against the netting or casing. As a result, it is possible to achieve a tighter net or more netting of the work product. The flat bottom also aids in keeping the work product aligned with the interior of the chute as it moves through the chute. The flat bottom also helps maintain the chute in alignment with the pushing system 26 and with the conveyor used to carry the netted work products away.

The chute is of sufficient length to span between the stuffing tube and the clipping system. This length can depend on various factors including, for example, the nature of the packaging material shirred on the exterior of the chute, the desired amount of packaging material that can be shirred onto the chute, the type and size of the work product being packaged, etc.

Manually graspable handles 198 project from the slide plate 164 outwardly in the projecting direction of chute 32. As explained below, these handles can be used to remove the chute assemblies 30 from the mounting plate assembly 132 after the packaging material 34 has been depleted from the chute 32 so that the packaging material can be re-shirred onto the chute assembly.

Figure 9:
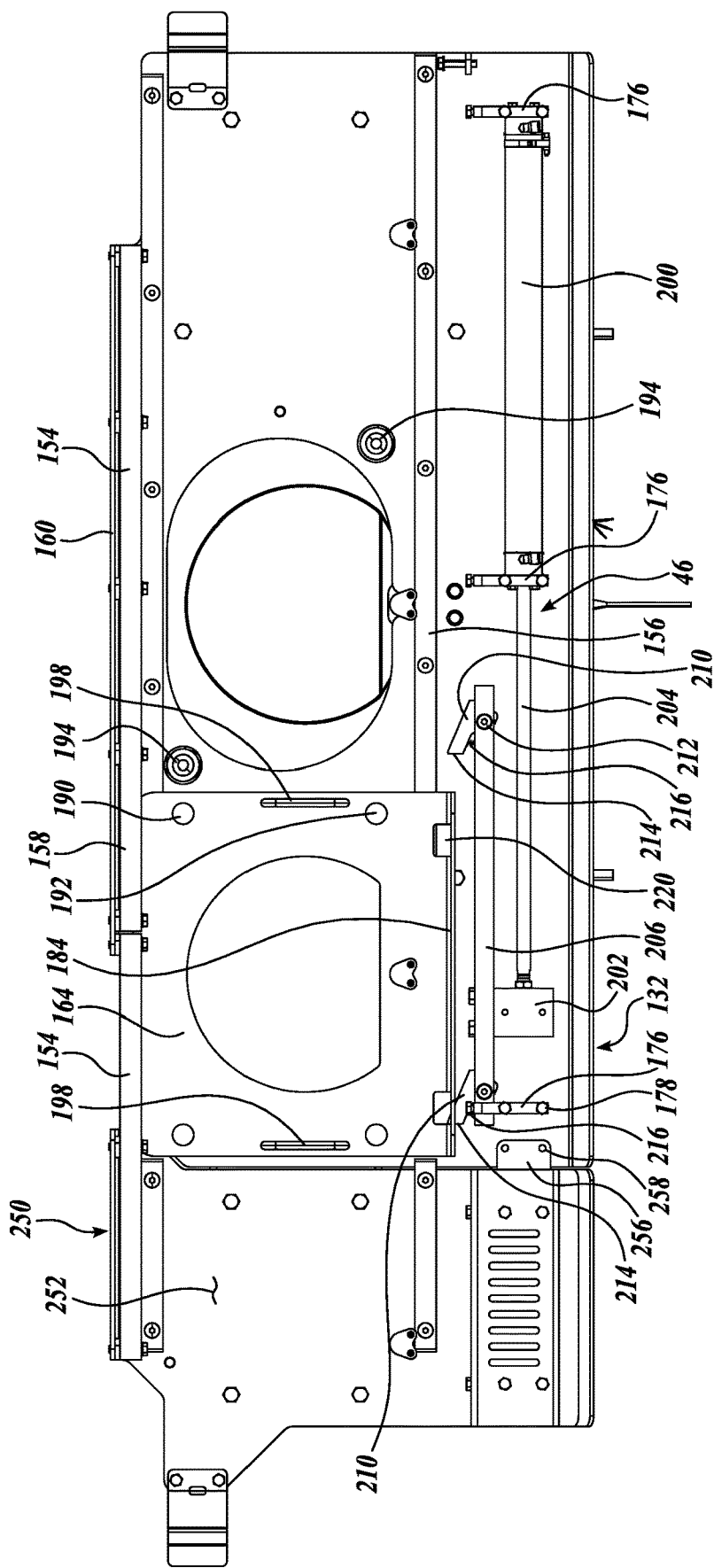
FIG. 9 is a fragmentary elevational view of FIG. 6.

Next, referring specifically to FIGS. 6 and 9, the actuator system 46 is provided to automatically position loaded chute assemblies 30 in registration with the stuffing tube 24. In this regard, a linear actuator 200 is mounted on the transverse plate 150 beneath the lower guide strip 156 by the same mounting blocks 176 used to mount the formed bracket 174 to the plate 150. An anti-pivot block 202 is attached to the leading and of an actuator rod 204 of the actuator 200. A pawl carrier beam 206 it's fastened to the upper surface of the block 202 by hardware members 208. The carrier beam 206 is supported by and slides along an upper shoulder formed in the mounting bracket 176 located at the forward end of the actuator 200. In this manner, the carrier beam 206 is maintained in horizontal orientation as the carrier beam moves back and forth along the lower portion of the transverse plate 150.

Pawls 210 are rotatably mounted to each end of the carrier beam 206. In this regard, slots extend downwardly through the end portions of the carrier beam to receive downwardly projecting sections off the pawls. Pivot shafts 212 extend through aligned openings formed in the carrier beam on opposite sides of the slots and through a clearance hole formed in the downwardly projecting sections of the pawls 210. The pawls pivot about the shafts 212. The extending distal ends 214 of the pawls 210 are biased in the upward direction by compression springs 216 that engage within blind holes formed in the underside of the extending distal ends 214 of the pawls. The opposite ends of the compression springs bear against the upper surface of the pawl carrier beam 206.

Figure 7:
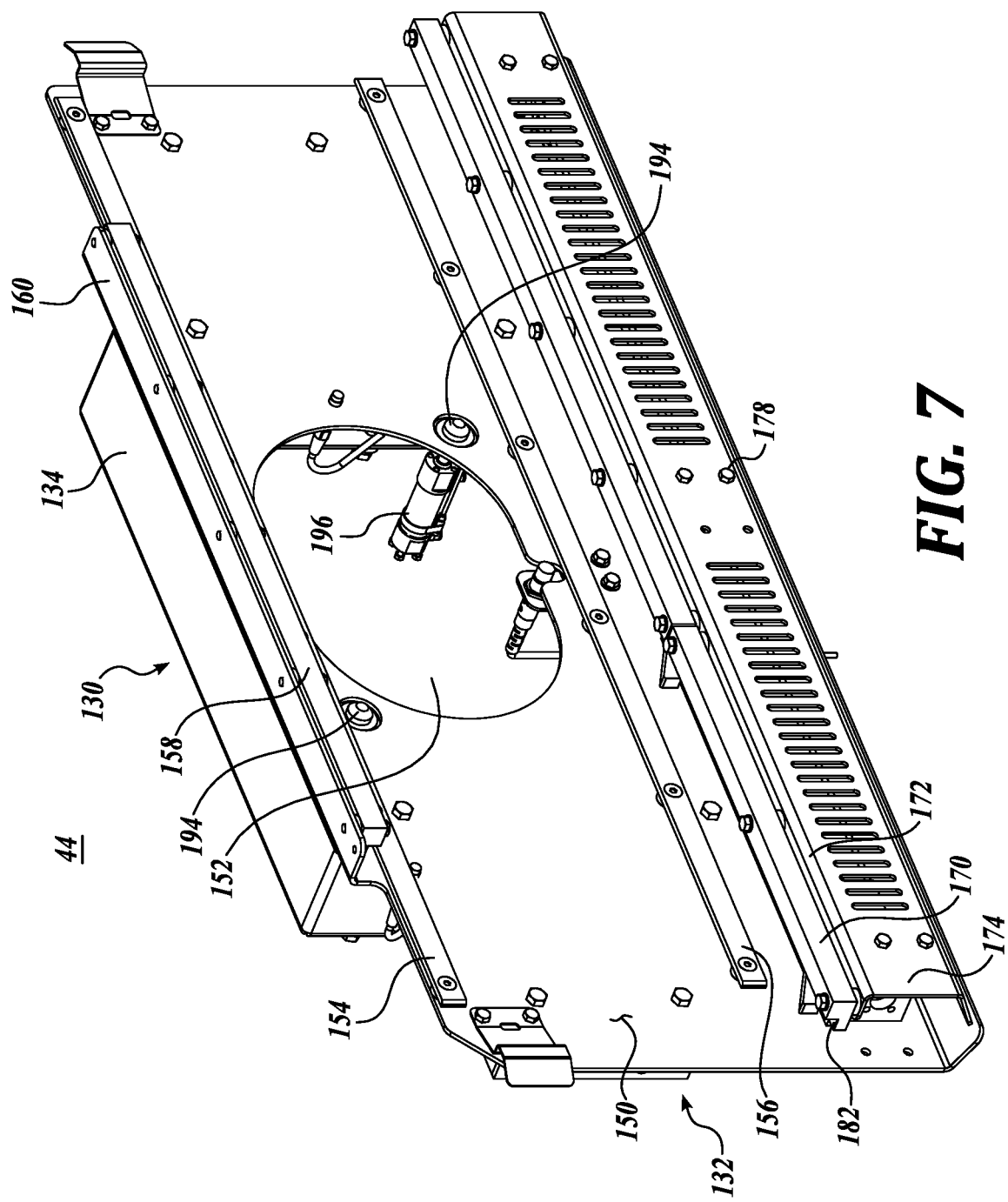
FIG. 7 is a fragmentary view of FIG. 5.

The extension ends 214 of the pawls 210 are configured to engage within openings or slots 220 formed in the lower flange 184 of the chute assembly slide plate 164, see FIGS. 8 and 9. The compression springs 216 bias the pawl extension ends 214 upwardly into engagement with the slots 220. With this engagement, the linear actuator 200, when extended, moves the chute assemblies 30 in the left hand direction, as shown in FIGS. 6, 7, and 9. However, when the linear actuator 200 is retracted, the pawls 210 automatically disengage from the slots 200 by the downward pivot of the extension end 214 as the pawls slide against the end of slot 220.

As shown in FIGS. 6 and 9, the two pawls 210 are separated from each other along the carrier beam 206 so that the pawls can engage the slots 220 of adjacent chute assemblies 30. In this manner, the actuator 200 is capable of moving or indexing two chute assemblies 30 at the same time. For example, when the chute assembly 30 that is aligned with the stuffing tube 24 has been depleted with packaging material, it can be moved to the left (FIGS. 6 and 9), as well as the next adjacent chute assembly 30 which is fully shared. As a result, the packaging apparatus 20 is capable of substantially continuous operation, since it is not necessary to manually remove a depleted chute assembly 30 from the apparatus 20 and replace it with a loaded chute assembly. Rather, only a short time delay is needed for the actuating system 46 to move the spent chute assembly 30 away from registration with stuffing tube 24 and replaced by a fully loaded chute assembly which had been previously placed alongside the spent chute assembly 30.

Figure 5:
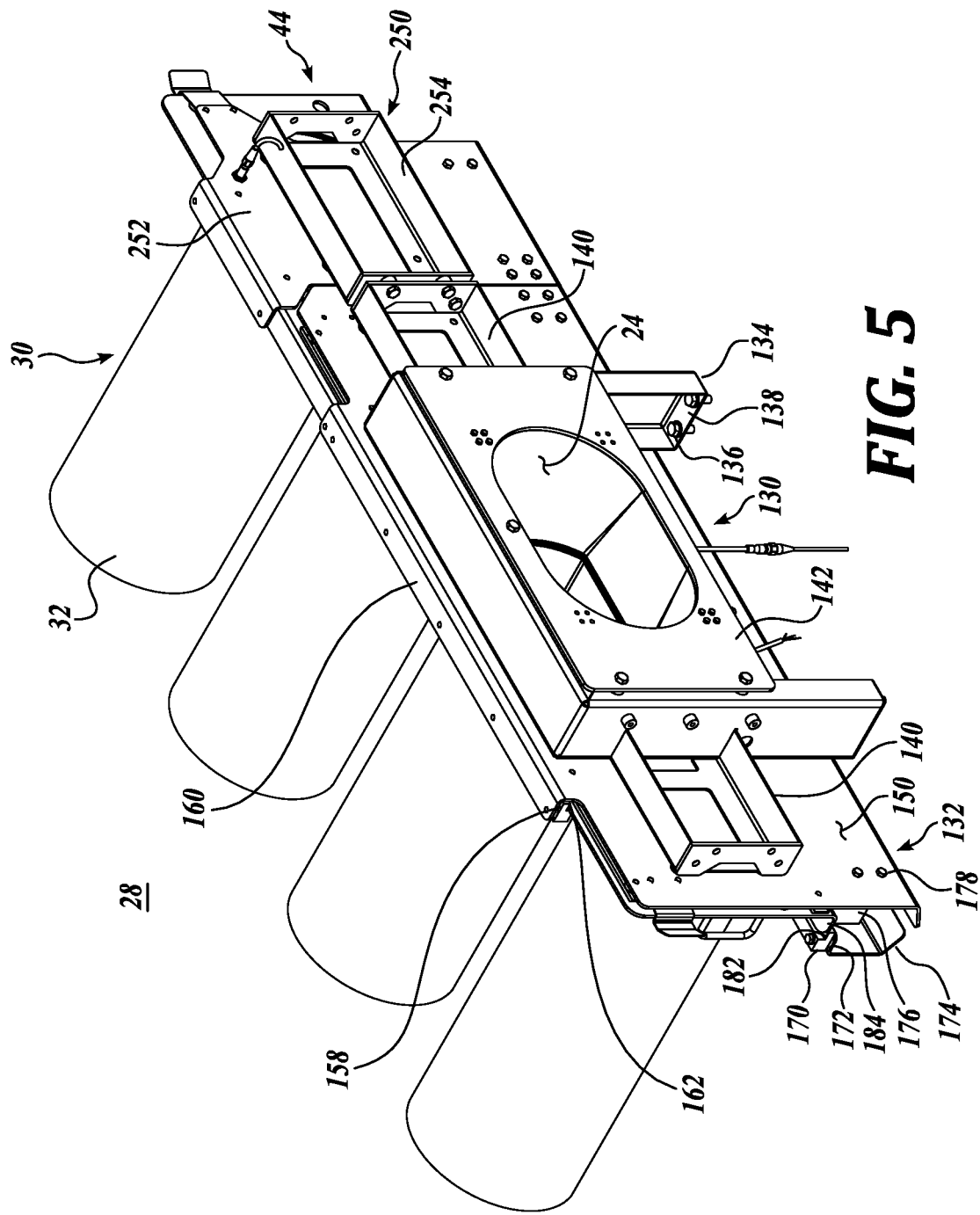
FIG. 5 is a fragmentary view of the chute exchange system utilized in the netting machine of FIGS. 1 and 2.

Referring to FIGS. 5, 6, and 9, an extension 250 of the mounting plate structure 44 is illustrated. In this regard, an extension plate section 252 is mounted adjacent corresponding end of the mounting plate 150, as shown in the right side end (as shown in FIG. 5) and the left side end (as shown in FIGS. 6 and 9). The extension plate section 252 can be connected to the plate 150 be a secondary bracket 254 positioned on the backside of the plate section 252. The secondary bracket 254 is constructed side-by-side to secondary bracket 140 of the plate 150 by appropriate hardware. Also, a bracket 256 projects from the front side of the plate section 252 to overlap the corresponding portion of the mounting plate 150 for attachment thereto by hardware members 258.

It will be appreciated that the extension 250 enables a fourth chute assembly 30 to be utilized. Such fourth chute assembly 30, as well as the next adjacent chute assembly 30, are both depleted of packaging material 34, and thus available for being reloaded (reshirred) with new packaging material.

It will also be understood that the packaging system 20 can be designed with the chute system capable of holding chute assemblies 30, in addition to those shown in the figures of the present application, on either side of the chute assembly 30 in use.

While illustrative embodiments have been illustrated and described, it will be appreciated that various changes can be made therein without departing from the spirit and scope of the invention.

The embodiments of the invention in which an exclusive property or privilege is claimed are defined as follows:

1. A multiple chute exchange system for a packaging machine, comprising:
   a. a chute mounting plate assembly having an opening formed therein for passage of work products passing out of an upstream stuffing tube and to be packaged;

b. a plurality of elongate chute assemblies having an exterior onto which packaging is shirred;

c. a linear guideway for detachably positioning at least three chute assemblies to project from the chute mounting plate assembly in a direction away from the stuffing tube, with one of the chute assemblies positionable in registration with the chute mounting plate assembly opening, the guideway having an entrance end for receiving a chute assembly shirred with a packaging material and an exit end for removal of a chute assembly devoid of shirred packaging material;

d. a first actuator for sliding the chute assemblies along the linear guideway and selectively positioning one of the chute assemblies in registry with the chute mounting plate assembly opening, the first actuator simultaneously engaging at least two adjacent chute assemblies.

2. The system of claim 1, wherein the guideway comprises upper and lower guide rails for engaging the chute assemblies.

3. The system of claim 2, wherein the chute assemblies each comprising a slide plate engageable with the upper and lower guide rails and a chute projecting from the slide plate in the direction opposite to the stuffing tube.

4. The system of claim 1, wherein the first actuator simultaneously moving a plurality of chute assemblies along the guideway.

5. The system of claim 1, wherein the plurality of elongate chute assemblies comprises at least a first chute assembly, a second chute assembly, and a third chute assembly; and wherein:

the first chute assembly is disposed in registry with the chute mounting plate assembly opening, and the guideway is adapted to support the second chute assembly on one side of the first chute assembly and support the third chute assembly on the opposite side of the first chute assembly from the second chute assembly.

6. The system of claim 5, wherein the guideway is adapted to support a fourth chute assembly adjacent one of the second and third chute assemblies.

7. The system of claim 5, wherein the guideway is adapted to support at least one additional chute assembly adjacent at least one of the second and third chute assemblies.

8. The system of claim 1, wherein the packaging is selected from the group including netting, fabric, or casing.

9. The system of claim 1, wherein the stuffing tube is in the form of a funnel that decreases in cross-sectional size in the direction of the chute assemblies.

10. A packaging machine assembly comprising:
the multiple chute exchange system of claim 1; and
a pushing system for pushing work products through the stuffing tube and through a corresponding chute assembly for being packaged into the packaging material loaded on the chute assembly.

11. The packaging machine assembly according to claim 10, further comprising a feeding system for delivering work products into registry with the stuffing tube, said work products being pushed through the stuffing tube and through the corresponding chute assembly by the pushing system.

12. The packaging machine assembly according to claim 11, wherein the feeding system comprises a conveyor positioned between the multiple chute exchange system and the pushing system.

13. The packaging machine assembly according to claim 12, wherein the conveyor comprises an endless belt disposed transversely to a direction that the pushing system pushes the work products.

14. The packaging machine assembly according to claim 10, wherein the pushing system comprises a servo actuator operable to control a stroke of the pushing system.

* * * * *

UNITED STATES PATENT AND TRADEMARK OFFICE
CERTIFICATE OF CORRECTION

PATENT NO. : 11,807,409 B1  
APPLICATION NO. : 17/660280  
DATED : November 7, 2023  
INVENTOR(S) : D. May et al.

Page 1 of 1

It is certified that error appears in the above-identified patent and that said Letters Patent is hereby corrected as shown below:

On the Title Page

| Column | Line | |
| --- | --- | --- |
| Abstract | 10 | change "shined" to -- shirred -- |

Signed and Sealed this  
Twenty-sixth Day of November, 2024

Katherine Kelly Vidal  
*Director of the United States Patent and Trademark Office*